Patented Apr. 20, 1948

2,440,219

UNITED STATES PATENT OFFICE 2,440,219

MANUFACTURE OF KETOTETRAHYDROPYRIDINE DERIVATIVES AND HYDROXYPYRIDINE DERIVATIVES

Franz Bergel and Aaron Cohen, Welwyn Garden City, England, assignors, by mesne assignments, to Hoffmann-La Roche Inc., Roche Park, Nutley, N. J., a corporation of New Jersey No Drawing. Original application April 8, 1943, Serial No. 482,324. Divided and this application August 23, 1944, Serial No. 550,856. In Great Britain March 9, 1942

4 Claims. (Cl. 260—295.5)

This invention relates to the synthesis of quaternary pyridinium salts which are intermediates for the production of 3 hydroxypyridine derivatives related to vitamin B6.

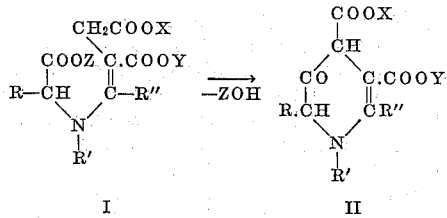

According to the invention, of our co-pending application Serial No. 482,324, of which this application is a divisional, compounds of the general Formula I are cyclised to yield ketotetrahydropyridine derivatives of the general Formula II. In Formula I, R may be an alkyl group or such other group as may be attached to the α-carbon atom of an α-amino-acid without interfering with the reactions taking place in the process according to the present invention. R' is an alkyl or aralkyl group; R'' is hydrogen, and X, Y and Z, which are not necessarily identical are lower alkyl groups such as methyl or ethyl. Compounds of Formula I are obtained, for example, by the reaction between an ester of an α-aminoacid and a monoacylsuccinic ester according to the process described in Specification of United States application Serial No. 455,383, filed August 19, 1942, now Patent No. 2,384,068. Thus, a starting material made from the ethyl ester of N-methylalanine and diethyl α-formyl-succinate according to the aforesaid specification would have Formula I where R=R'=CH3; R''=H, and X=Y=Z=C2H5.

The above mentioned cyclisation is carried out according to the invention of the aforesaid co-pending application Serial No. 482,324 by submitting compounds of Formula I to the action of an alkali metal such as sodium, or alcoholates thereof, preferably in an inert solvent such as benzene or toluene and under an inert atmosphere such as nitrogen. The reaction proceeds with the elimination of the elements of the alcohol represented by Z.OH, and with the formation of the alkali metal derivative of the ketotetrahydropyridine derivative, which has the Formula II, in which R, R', R'', X and Y bear the same interpretation as given above. The alkali metal derivative is suitably treated with acid to liberate the compound II, and the latter is converted into a hydrohalide salt by treatment with anhydrous hydrogen halide. These salts are expressed by the Formula III, showing the enolic form, and constituting a substituted 3-hydroxydihydropyridine hydrochloride, corresponding to a substituted 3-ketotetrahydropyridine hydrochloride.

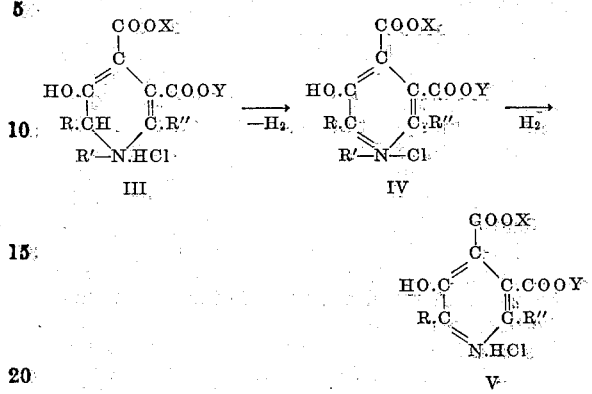

According to the present invention salts such as the hydrochloride shown in Formula III are submitted to a dehydrogenation, which has been discovered to occur, for instance, by exposing the salt in absolute alcohol and ether to any oxygen-containing gas such as air or to oxygen. With the loss of two hydrogen atoms, a 3-hydroxypyridinium chloride is formed, having the Formula IV.

The conversion of compounds IV to V is claimed in our copending application, Serial No. 550,855.

The pyridinium salts described are useful intermediates in the synthesis of vitamin B6.

The following examples illustrate how the process of the invention may be carried into effect:

1. A solution of 30 parts by weight of the condensation product obtained from the ethyl ester of N-methyl alanine and diethyl α-formyl-succinate (as described in Example 7 of specification of application Serial No. 455,383, now Patent No. 2,384,068, issued September 4, 1945) in 120 parts by volume of dry benzene is added to a benzene suspension of 2.1 parts by weight of powdered sodium in an atmosphere of dry nitrogen, and the mixture is gently heated under reflux. The sodium dissolves, and heating is then continued for 1 hour. The solution is cooled and shaken with a mixture of ice and the calculated amount of acetic acid containing a small amount of sulphuric acid which is equivalent to the sodium used. The benzene extract is washed with water, sodium bicarbonate solution, water again, dried and freed from solvent. The residual oil is dissolved in concentrated anhydrous alcoholic hydrogen chloride and treated with excess of dry ether. The product precipitated is rubbed till solid and ground to a powder consisting of the hydrochloride of 1:2-di-methyl-3-hydroxy-4:5-dicarbethoxydihydropyridine (III, where

R=R'=CH₃ R''=H, X=Y=C₂H₅).

This hydrochloride is dehydrogenated by dissolving in the minimum amount of warm absolute alcohol and adding an equal volume of ether, and exposing the solution to air or oxygen. After about 1 day, more ether, or ethyl acetate, is gradually added to precipitate the product. By repetition of the process, the product, 1:2-dimethyl-3-hydroxy-4:5-dicarbethoxypyridinium chloride (IV, where R=R'=CH₃, R''=H, and X=Y=C₂H₅) crystallises out in colourless needles, having a melting point of 165° C., with decomposition.

2. dl-Alanine methyl ester is mixed with slightly more than the molecular equivalent of benzaldehyde. The Schiff base formed is dried in ethereal solution, the ether removed, and the residue dissolved in approximately four parts by volume of methyl alcohol and hydrogenated over palladised charcoal. After removal of the catalyst and solvent, the residue is distilled, yielding the methyl ester of N-benzylalanine (methyl α-benzylaminopropionate) as a colourless liquid having a boiling point of 131–133° C./10 mm. 19.3 parts by weight of this compound are mixed with 17.5 parts by weight of dimethyl α-formylsuccinate in accordance with the method described in specification of application Serial No. 455,383. After heating the mixture for 1 hour on the water-bath, it is cooled and dissolved in dry ether or benzene. A small amount of diketopiperazine derivative, corresponding to the amino ester, separates and is collected. The solution is washed with cold sodium bicarbonate solution, dried, freed from solvent and the residue distilled, yielding the condensation product (I: where R=CH₃, R'=CH₂Ph, R''=H, X=Y=Z=CH₃) as a viscous yellow oil having a boiling point of about 200° C./0.3 mm.

A solution of 36 parts by weight of this compound in 120 parts by volume of dry benzene, in which are suspended 2.4 parts by weight of powdered sodium, is boiled under reflux in an atmosphere of nitrogen. Dissolution of the sodium is facilitated by the addition of a small amount of sodium methoxide or sodium ethoxide. Heating is then continued for 1 hour and the solution is then cooled and acidified as described in Example 1. The washed and dried benzene extract is freed from solvent and treated with sufficient anhydrous alcoholic hydrogen chloride to form the hydrochloride of the cyclisation product. This is precipitated as a slowly solidifying oily product by the addition of excess of anhydrous ether. However, by adding insufficient ether for the precipitation to occur and by exposing the alcoholic-ethereal solution to air or oxygen for at least one day, the dehydrogenation product separates gradually as fine colourless needles having a melting point of 146–148° C. This compound is 1-benzyl-2-methyl-3-hydroxy-4:5-dicarbmethoxy-pyridinium chloride (IV, where R=CH₃, R'=CH₂pH, R''=H, X=Y=CH₃).

3. The preparation in accordance with Example 2 is repeated but with the substitution of 5.6 parts of sodium methoxide in place of 2.4 parts of powdered sodium. The reactions and quantities are otherwise identical with those of Example 2 and the same product is obtained.

We claim:
1. A process for the manufacture of quaternary pyridinium salts of the general formula

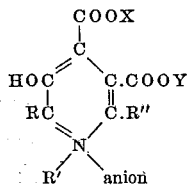

which comprises converting into a salt a compound of the general formula

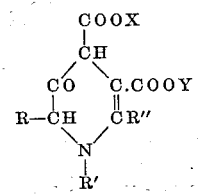

in which R is alkyl, R' is a member selected from the group consisting of alkyl and aralkyl radicals, R'' is hydrogen, and X and Y are lower alkyl radicals, not necessarily identical, and dehydrogenating the salt by treatment with a member selected from the group consisting of oxygen and oxygen-containing gases.

2. A process for the manufacture of 1.2-dimethyl-3-hydroxy-4:5 - dicarbethoxypyridinium chloride of the formula

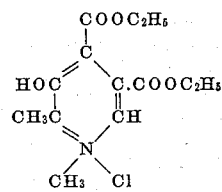

which comprises converting 1.2-dimethyl-3-hydroxy-4:5-dicarbethoxydihydropyridine into its hydrochloride by means of hydrogen chloride and dehydrogenating the product by exposing it to the action of a member selected from the group consisting of oxygen and oxygen-containing gases.

3. As a new chemical compound, 1.2-dimethyl-3-hydroxy-4:5-dicarbethoxypyridinium chloride of the formula

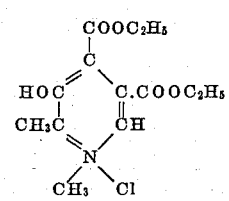

4. A process for the manufacture of quaternary pyridinium salts of the general formula

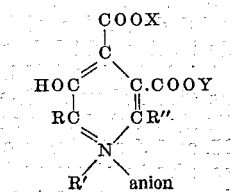

which comprises dehydrogenating a compound of the general formula

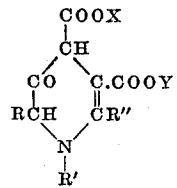

in the form of its salt, and in which R is alkyl, R' is a member selected from the group consisting of alkyl and aralkyl radicals, R'' is hydrogen, and X and Y are lower alkyl radicals, not necessarily identical.

FRANZ BERGEL.
AARON COHEN.

REFERENCES CITED

The following references are of record in the file of this patent:

FOREIGN PATENTS

| Number | Country | Date |
|---|---|---|
| 119,056 | Australia | Oct. 9, 1944 |
| 556,044 | Great Britain | Sept. 17, 1943 |
| 161,482 | Ireland | Mar. 15, 1944 |

Certificate of Correction

Patent No. 2,440,219.

April 20, 1948.

FRANZ BERGEL ET AL.

It is hereby certified that errors appear in the above numbered patent requiring correction as follows: In the grant, line 16, strike out the words "of seventeen years"; same line, after "grant" insert *until March 9, 1962*; in the heading to the printed specification, line 13, before "4 Claims." insert the following—*Section 1, Public Law 690, August 8, 1946, Patent expires March 9, 1962*; in the printed specification, column 2, line 26, for "to any" read *to an*; column 3, line 7, in the equation, for "CH$_3$R'''" read *CH$_3$, R'''*; line 36, for "colled" read *cooled*; line 69, for "CH$_2$pH" read *CH$_2$Ph*; and that the said Letters Patent should be read with these corrections therein that the same may conform to the record of the case in the Patent Office.

Signed and sealed this 3rd day of August, A. D. 1948.

[SEAL]

THOMAS F. MURPHY,
*Assistant Commissioner of Patents.*